United States Patent [19]

Kelly

[11] 4,416,930
[45] Nov. 22, 1983

[54] TREATING GLASS SHEETS TO HEAL VENTS THAT RESULT IN BREAKAGE DURING THERMAL TREATMENT

[75] Inventor: Joseph B. Kelly, Crestline, Ohio

[73] Assignee: PPG Industries, Inc., Pittsburgh, Pa.

[21] Appl. No.: 364,144

[22] Filed: Mar. 31, 1982

Related U.S. Application Data

[63] Continuation of Ser. No. 210,100, Nov. 24, 1980, abandoned, which is a continuation of Ser. No. 971,607, Dec. 20, 1978, abandoned.

[51] Int. Cl.$^3$ .............. B32B 17/06; B32B 3/10; C03C 17/02
[52] U.S. Cl. .................. 428/137; 428/174; 428/336; 428/428; 428/432; 427/140; 427/269; 427/287; 427/376.2; 427/374.7; 427/429; 65/28; 65/30.14; 65/60.8; 296/84 R; 296/90
[58] Field of Search ............ 428/428, 432, 137, 174, 428/336; 296/84 R, 90; 65/28, 30.14, 60.4, 60.8; 427/140, 269, 376 A, 287, 376 B, 374.7, 429, 376.2

[56] References Cited

U.S. PATENT DOCUMENTS

| 1,672,857 | 6/1928 | Blake et al. | |
| 2,236,911 | 4/1941 | Long | 49/81 |
| 2,779,136 | 1/1957 | Hood et al. | 49/79 |
| 2,871,623 | 2/1959 | Marini | 49/84 |
| 3,149,945 | 9/1964 | Betrand et al. | 65/23 |
| 3,232,788 | 2/1966 | Marzocchi et al. | |
| 3,251,670 | 5/1966 | Acloque | 65/115 |
| 3,287,201 | 11/1966 | Chisholm et al. | 65/30.14 |
| 3,352,655 | 11/1967 | Barch et al. | 65/28 |
| 3,498,773 | 3/1970 | Grubb et al. | 65/30 |
| 3,505,051 | 4/1970 | Buckley et al. | 65/60 |
| 3,551,234 | 12/1970 | Britton | 156/98 |
| 3,765,859 | 10/1973 | Seymour | 65/114 |
| 3,827,872 | 8/1974 | Augustin et al. | 65/114 |
| 3,843,472 | 10/1974 | Toussaint et al. | 161/199 |
| 3,894,858 | 6/1975 | Rogers | 65/23 |
| 3,960,535 | 6/1976 | Hamilton et al. | 65/104 |
| 3,988,136 | 10/1976 | Rogers | 65/23 |
| 4,000,997 | 1/1977 | Rogers | 65/23 |
| 4,021,218 | 5/1977 | Watanabe | 65/30 |
| 4,023,945 | 5/1977 | Boaz | 65/112 |
| 4,164,402 | 8/1979 | Watanabe | 65/30 |

FOREIGN PATENT DOCUMENTS 254225 5/1963 Australia .

Primary Examiner—Alexander S. Thomas
Attorney, Agent, or Firm—Edward I. Mates

[57] ABSTRACT

This invention relates to applying a protective composition to the vicinity of a scored region of a glass sheet. The scored region is weakened and develops vents as a result of the scoring. Such vents are likely to develop breakage when the glass sheet is subjected to a thermal treatment associated with tempering. The application of the protective composition is made before the glass sheet is subjected to thermal processing by heating to above its strain point followed by rapid cooling below its strain point. The protective composition flows at a lower temperature than the glass sheet to which it is applied and is capable of healing the scored region during the thermal treatment to which the glass sheet is subjected after the application of said protective composition, thereby reducing the tendency of a vent to develop into glass breakage during said thermal treatment.

10 Claims, 5 Drawing Figures

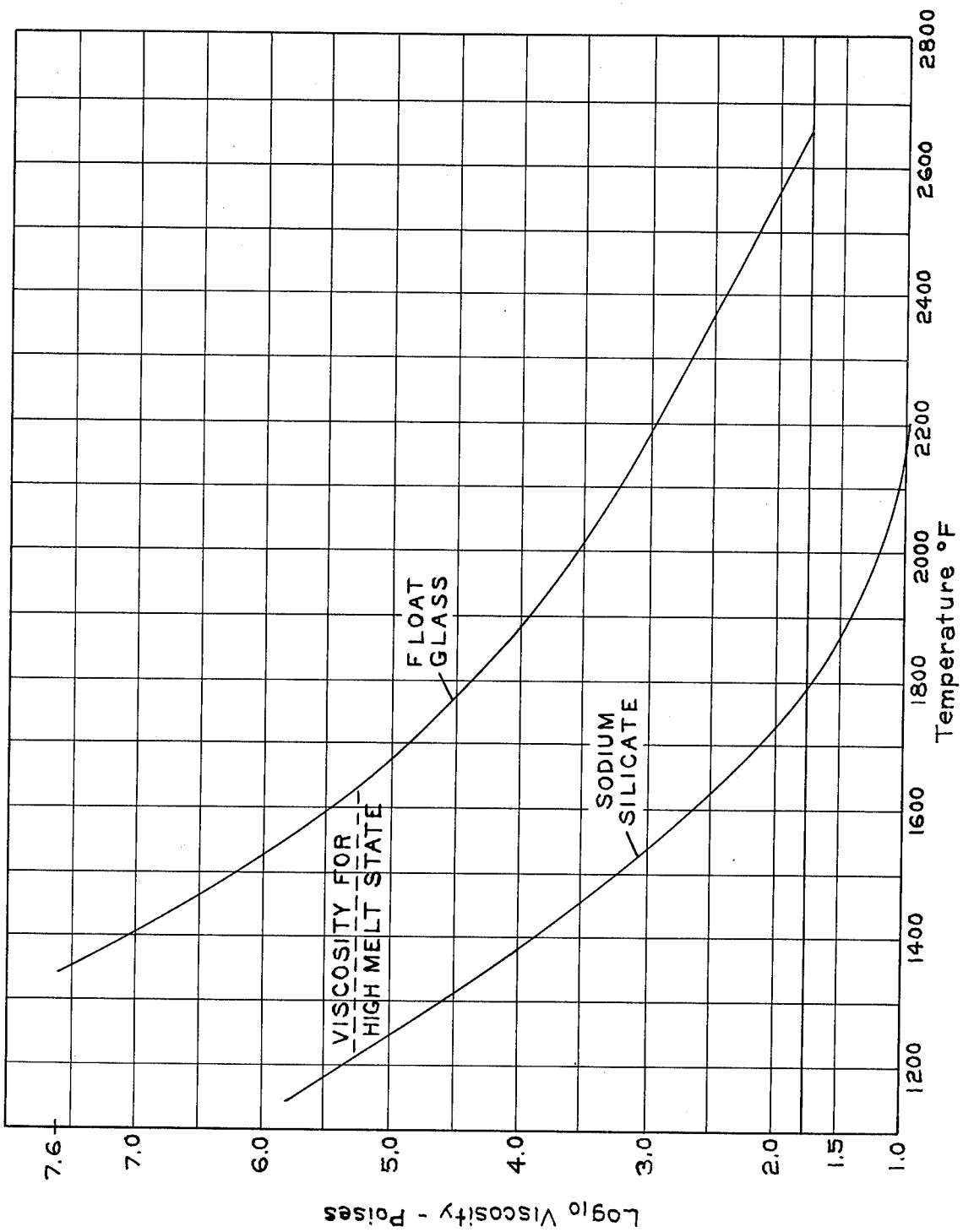

TREATING GLASS SHEETS TO HEAL VENTS THAT RESULT IN BREAKAGE DURING THERMAL TREATMENT

This is a continuation of application Ser. No. 210,100, filed Nov. 24, 1980, now abandoned which in turn is a continuation of U.S. Ser. No. 971,607 filed Dec. 20, 1978, now abandoned.

BACKGROUND OF THE INVENTION

The present invention relates to treating glass sheets, and particularly refers to a method of reducing vents that result in breakage during thermal treatment commonly associated with tempering of glass sheets. Glass sheets are scored when they are cut and/or drilled to provide holes extending through the thickness of the glass. The scored regions usually have vents associated therewith.

When glass sheets are tempered, they are heated to above the strain point of the glass, and even as high as a temperature approaching the glass softening point. After the glass attains a temperature sufficient for tempering, it is chilled rapidly. Stresses are established temporarily in the glass during this rapid cooling. These stresses may become so severe as to cause the glass sheet to fracture during the tempering operation. Glass fracturing during tempering is frequently observed in the vicinity of vents near those regions that are scored when the glass is cut, such as for drilling holes through the glass.

Many fabricated products of glass require thermal treatment involving heating the sheet to between its strain point and its melting point as part of their fabrication. Among the many articles of commerce that require such thermal treatment are tempered and partly tempered windows, lenses, cover plates and automotive and other vehicle glazing closures, such as windshields, backlights, vent panes, And sidelights.

Many movable glazing closures for present day vehicles must be drilled to produce holes that receive actuating rods associated with motors or cranks or other actuating mechanisms for opening and closing the glazing closures. Also, many of the articles of commerce fabricated from glass sheets require pre-cutting to irregular outlines. Unless considerable care is taken to seam the edges of the pre-cut sheets or to smooth the drilled portion formed into a hole, vents form along the edge of the glass periphery around the drilled portion. Such vents sometimes result in breakage during the thermal treatment. This breakage increases in frequency when the glass sheets so fabricated have a nominal thickness of 5/32 inch (4 millimeters) and less instead of thicker glass sheets that were used for similar parts in the prior art.

The prior art recognizes the fact that vents are associated with glass breakage during the tempering operation involving the thermal treatment described previously. It is well known that a glass sheet to be tempered adequately must be heated to a temperature sufficient to lower the viscosity of the glass sheet to enable it to flow sufficiently when chilled rapidly to establish a surface region stressed in compression surrounding an interior region stressed in tension. If the glass sheet is heated to a temperature above the optimum temperature for tempering, the glass sheet tends to lose its shape before it is subjected to the rapid cooling step. The lower the maximum temperature to which the glass sheet is heated, the greater is the likelihood that the glass sheet will fracture, particularly when temporary tension stresses arise during thermal treatment associated with tempering that cause a vent to develop into glass breakage. The need to heat each glass sheet to a maximum temperature within a narrow temperature range suitable for tempering is difficult to obtain in a commercial mass production operation where successive glass sheets precut to an identical outline of a production pattern differ in thickness and in distributions of stress around the scored regions so that a uniform time-temperature cycle applied to each glass sheet in a series of identical production pattern outlines does not necessarily avoid breakage of some of the treated glass sheets, particularly when the sheets are scored to produce holes through their thickness.

In the past, several different techniques have been suggested for reducing the losses due to breakage originating in the vicinity of vents in thermally treated glass articles at scored regions. These include providing a different thermal treatment for the region likely to be the source of breakage than the remainder of the glass sheet undergoing thermal treatment to develop a temper. Some of these techniques include blocking or insulating heat locally to provide a reduction in damage in the blocked or insulated region; applying a heat absorbing and re-radiating material in the vicinity of the scored region to cause the glass to selectively heal any vents by increasing the local temperature in the vicinity of the scored region; using an insulating material to prevent heat loss and reduce temporary stress levels locally during a thermal treatment involved in tempering, and selectively applying a heat source locally to the vicinity of an aperture during thermal treatment involved in tempering. In addition, it has been recognized that edges, as well as drilled holes, become weakened as a result of scoring and cutting to divide larger sheets into smaller sheets, and these have been strengthened by selective seaming, by localized heating, by application of fluoride-containing compounds and by applying materials having a low coefficient of thermal expansion compared to the glass such as a glassy frit having a melting point less than the rest of the glass sheet along seamed edges that require strengthening.

DESCRIPTION OF THE PRIOR ART

The following patents were discovered in a novelty search for the present invention.

U.S. Pat. No. 3,149,945 to Bertrand and Acloque and U.S. Pat. No. 3,251,670 to Acloque disclose methods of differentially treating glass objects thermally by giving different areas of the same objects different thermal treatments. A selected zone is coated with a coating material such as a carbon black, mica flakes or aluminum paint prior to the thermal treatment so as to provide an area of less stress than other areas and thereby provide a limit to the portion of the glass sheet that breaks if the glass object is fractured. If one of a pair of adjacent areas that are thermally treated differently breaks, the break stops at the boundary with the other adjacent area and does not penetrate into the other adjacent area.

U.S. Pat. No. 2,871,623 to Marini refers to a method of bending glass sheet differentially by applying a material that selectively absorbs and locally re-radiates heat (such as carbon black dispensed in a liquid vehicle) to enhance localized bending of a glass sheet while the sheet is mounted on a bending mold and subjected to thermal treatment to cause the glass to sag and be shaped.

U.S. Pat. No. 3,551,234 to Britton discloses a method of repairing breaks in the glass linings of glass lined vessels by grinding an enlargement of a break, filling the enlarged hole and seat so formed with an epoxy or silicone cement and positioning a glass disc in the enlarged seat.

U.S. Pat. No. 3,765,859 to Seymour strengthens a scored edge of a glass sheet by applying an edge protecting composition taken from the class of compositions having a low coefficient of expansion compared to glass and/or a heat transfer coefficient not greater than glass while maintaining the major surfaces inwardly of each of said surfaces on or adjacent the peripheral edge substantially free of the edge protecting composition. The glass with its edge so treated is then subjected to thermal treatment which results in a tempered glass sheet.

U.S. Pat. No. 3,827,872 to Augustin and Long discloses a glass sheet tempering method in which the trailing edge of the glass sheet supported on a glass handling fixture is preheated prior to the glass sheet entering into a glass heating chamber to reduce local stress.

U.S. Pat. No. 3,843,472 to Toussaint, Laroche, Schotty and Lambert strengthens an edge of a glass sheet by initially smoothening the surface and subjecting the smoothened edge to a chemical tempering treatment and to a rectifying treatment involving the application of fluoride ions to the edge for reducing or removing stress concentrations when the edge is subjected to tensile loading.

U.S. Pat. Nos. 3,894,858; 3,988,136; and 4,000,997 to Rogers disclose various techniques of applying an insulating material such as a thin tape of asbestos or the like to provide heat insulation to locally reduce the rate of glass surface cooling in certain regions of a cathode ray tube during the process of salvaging such tubes.

The following patents relate to the treatment of glass sheets having apertures through the thickness thereof and methods taken to reduce the incidence of fracture in the vicinity of the score mark that is involved with producing a hole through the thickness of the glass sheet.

U.S. Pat. No. 3,352,655 to Barch and Posney discloses a method of controlling heat application to repair scored regions of a glass sheet that involves applying to the vicinity of the periphery of a hole drilled through the thickness of the glass sheet a composition suitable to selectively absorb and locally re-radiate heat to help heal the scores or vents formed in the vicinity of the periphery of each hole. Finely divided carbon and/or finely divided copper are ingredients of especially suitable compositions used for this purpose.

U.S. Pat. No. 3,960,535 to Hamilton and Oelke discloses a method of bending glass sheets having holes extending through their thickness that involves directing localized heat to selective portions of the glass sheet that are apertured or provided with holes during the bending of the sheets to condition the sheet for subsequent tempering.

U.S. Pat. No. 4,023,945 to Boaz discloses cutting a relief opening in a glass sheet from a hole drilled through the glass sheet thickness to an edge of the glass sheet and thereafter carrying out a conventional tempering operation. The relief opening is alleged to reduce the breakage which occurs in the glass sheet because of the stresses set up therein during the quenching portion of the glass tempering operation.

SUMMARY OF THE PRESENT INVENTION

The present invention relates to treating glass sheets to heal vents that result in breakage during thermal treatment by a method which comprises applying to a scored region of the glass sheet a protective composition that adheres to the scored region at the temperature of application (usually approximately room temperature), and that has a lower viscosity than the composition of the glass sheet in the temperature range of the thermal treatment required for tempering prior to subjecting the glass sheet to tempering. This protective composition is applied in a form that adheres to the scored region of the glass sheet at room temperature and which is capable of flowing into and healing the scored region while the glass sheet is subjected to the thermal treatment. Thus, when the glass sheet with the protective composition applied to the scored region is subjected to conventional thermal treatment involved in tempering, the vents are healed to virtually eliminate breakage entirely during the thermal treatment involved in tempering, even through glass sheets untreated in the scored region are likely to break during identical thermal treatment. According to a specific embodiment of the present invention for use with a glass sheet composed of a soda-lime-silica glass composition, the protective composition is applied in the form of a liquid carrier containing as an essential ingredient a composition having a high concentration ratio of sodium ions that does not decompose prior to forming a glassy composition having a higher soda to lime ratio than that of the glass sheet. A most preferred composition contains a sodium silicate composition as the glass forming ingredient. The most preferred method of application is in the form of a viscous aqueous dispersion. Other suitable protective compositions contain non-alkali metals such as lead, whose oxides provide additives for soda-lime silica glasses that tend to develop glass compositions having a lower viscosity than that of the basic glass composition that they modify.

The present invention will be understood better in the light of a description of a preferred embodiment and other variations thereof which follows.

BRIEF DESCRIPTION OF THE DRAWINGS

In the drawings which form part of the description of a method performed according to the present invention and where like reference numbers refer to like structural elements.

FIG. 5 is a diagram showing a comparison of the log viscosity of sodium silicate, the best embodiment of the present invention compared to that of float glass over a wide elevated temperature range.

DESCRIPTION OF THE PREFERRED EMBODIMENT AND ALTERNATIVES

Figure 1:
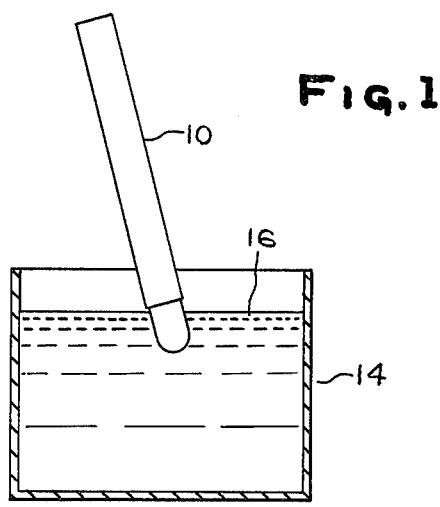
FIG. 1 is a view of a container containing a protective composition conforming to the present invention and shows an applicator means in the form of a pencil-like member having a felt tip dipped into the composition prior to applying the composition to the peripheral wall of a hole extending through the entire thickness of an apertured glass sheet.

Referred to the drawings, FIG. 1 shows an applicator means in the form of a pencil-like member 10 having a felt tip 12 at one end thereof. The pencil-like member 10 is immersed into a container 14 containing a protective composition 16.

A preferred protective composition for use in performing the present invention is sodium silicate. A preferred composition is an aqueous, viscous solution of sodium silicate. A very effective water solution of sodium silicate has a specific gravity of 41 degrees Baume'.

Figure 2:
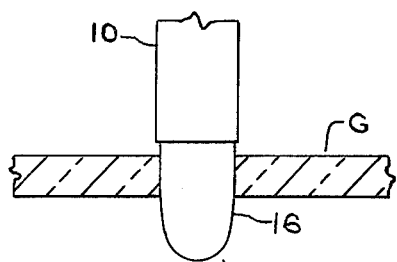
FIG. 2 is an enlarged fragmentary cross-sectional view of an apertured portion of a glass sheet showing how the felt tip of FIG. 1 impregnated with the protective composition applies the protective composition to the perimeter of a hole extending through the thickness of a glass sheet.
Figure 3:
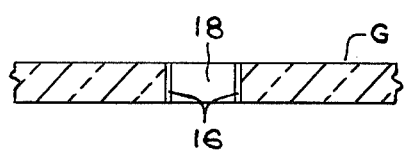
FIG. 3 shows the glass sheet portion of FIG. 2 after the felt tip has applied the composition to the wall of the hole extending through the thickness of the glass sheet and has been removed from the hole.
Figure 4:
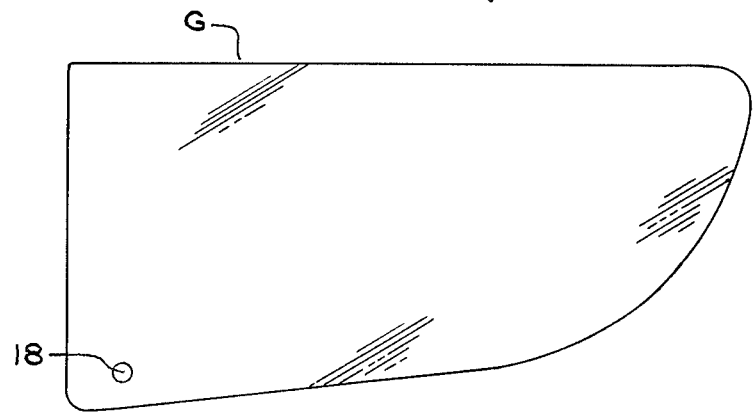
FIG. 4 is a view of the glass sheet showing the location of the portion containing the hole which is subject to the treatment of the present invention.

The position occupied by the felt tip relative to a hole 18 to which the sodium silicate composition is applied is shown in FIG. 2. In FIG. 3, the hole 18 is shown with a thin film 16 of sodium silicate composition which adheres to the peripheral wall of the hole extending through the thickness of the glass sheet G. A suitable film thickness is approximately 1 mil (0.0254 mm). A typical position of the hole 18 relative to the extent of the glass sheet is shown in FIG. 4. The tendency for the hole to cause breakage in the glass is associated with vents that form in the vicinity of the hole during the drilling of the hole through the thickness of the glass sheet G.

The apertured glass sheet with the viscous, adherent sodium silicate composition applied to the periphery of the hole throughout its extent is then subjected to a typical thermal treatment involved in tempering which involves heating the glass sheet to the vicinity of 1200° F. (650° C.) and then chilling the heated glass sheet sufficiently rapidly to establish a stress pattern of desired magnitude and configuration throughout the thickness of the glass. The application of the sodium silicate composition prior to the thermal treatment is believed to result in a chemical fusion of the sodium silicate, which has a lower viscosity than the float glass substrate throughout the temperature region to which the glass and the applied coating is heated. Sodium silicate is believed to chemically combine with the float glass to form a glass which is of an intermediate glass composition. The intermediate glass flows into the vents and in effect becomes fire or heat polished as it approaches its melting point.

The sodium silicate composition has a sufficiently low enough viscosity for a high melt state at approximately 1200° F. (650° C.) to flow. Normally, commercial float glass requires a temperature in excess of 1600° F. (870° C.) to obtain the same viscosity state. It is believed that the ready flow of the sodium silicate glass composition compared to that of float glass sufficiently heals vents that are formed during cutting so as to reduce the tendency of the glass to develop high tension stresses during the thermal treatment involved in tempering that would cause the glass sheet to break during thermal treatment.

In order to prove the theory that an intermediate glass product is formed by applying the sodium silicate to the periphery of a hole followed by thermal treatment associated with tempering, various float glass samples were provided with half-inch diameter holes, some were treated with sodium silicate and control samples were untreated. All the samples were analyzed for sodium and calcium concentration in the vicinity of the hole. The surface composition of the treated areas was found to be relatively poor in calcium and rich in sodium compared to the surface composition of the untreated areas. Furthermore, in depth analysis of the treated samples after the samples (including the treated and controlled samples) were subjected to a thermal treatment similar to that involved in a commercial glass sheet tempering operation, showed that the treated samples had a sodium to calcium concentration ratio that decreased inwardly from the exposed treated surface. The control specimens which were not treated had virtually uniform sodium to calcium concentration ratios at different scan depths.

ALTERNATE COMPOSITIONS

While the sodium silicate compositions are most suitable because of the fact that the sodium silicate is soluble in water and can be easily applied at room temperature using a felt tip pencil-like member, other materials also seem to improve the tempering operation by reducing the breakage in the vicinity of the scored regions. For example, a dispersion of sodium silicate in oil applied directly to the peripheral wall of a hole prior to thermal treatment simulating tempering reduces glass breakage frequency when the applied composition is sufficiently viscous to avoid running over the major surface of the glass sheet. Other compositions tested for less breakage include aqueous solutions or dispersions of sodium chloride, sodium sulfate, potassium sulfate, sodium borate, lithium carbonate, barium sulfate, and HCl solutions of lead oxide. The other materials enumerated were tested after three days of a production operation in which sodium silicate was applied to the inner periphery of each aperture of each apertured glass sheet without any breakage in the vicinity of the holes. The first change involved treating 10 consecutive sheets of glass identical to those produced without breakage for three days in the same manner as regular production except that the application of sodium silicate was omitted. Subsequently, 10 consecutive glass sheets were treated with various materials and the number of plates lost in production noted for each treatment. The results are tabulated in Table I that follows:

TABLE I

RESULTS OF DIFFERENT TREATMENTS OF APERTURES UNDER CONDITIONS PRODUCING 100% YIELD ON VENT HOLE HEALING WITH SODIUM SILICATE

| Hole Treatment | Holes Treated | Sheets Lost (Comments) |
| --- | --- | --- |
| None | 10 | 5 (Control samples) |
| Concentrated NaCl in water | 10 | 0 |
| Concentrated LiCO$_3$ in water | 10 | 3 |
| Sodium silicate (30% water added to 41° Baume') | 10 | 0 |
| Sodium sulfate (concentrated aqueous solution) | 10 | 0 |
| Concentrated NaNO$_3$ in water | 10 | 10 (NaNO$_3$ decomposed) |
| Concentrated sodium borate in water | 10 | 3 |
| Concentrated potassium sulfate in water | 10 | 2 |
| Concentrated LiNO$_3$ in water | 10 | 5 |

TABLE I-continued
RESULTS OF DIFFERENT TREATMENTS OF
APERTURES UNDER CONDITIONS PRODUCING 100%
YIELD ON VENT HOLE HEALING WITH SODIUM
SILICATE

| Hole Treatment | Holes Treated | Sheets Lost (Comments) |
|---|---|---|
| Concentrated BaSO$_4$ in water | 10 | 5 |
| Concentrated PbO in HCl | 10 | 2 |

On the following day, the furnace conditions were changed by lowering the top temperature the glass sheets attained while conveyed through the furnace so that only 9 of 10 apertured glass sheets treated at their holes with sodium silicate were produced successfully. Under these more nearly marginal production conditions, only 5 of 10 apertured glass sheets treated with a concentrated NaCl solution in water and only 5 of 10 apertured glass sheets treated with a concentrated Na$_2$SO$_4$ solution in water were successfully produced. Improving the furnace temperature conditions caused a resumption of good yields for apertured glass sheets treated with sodium silicate, sodium chloride and sodium sulfate, the only ones retested.

Aqueous solutions of NaCl and Na$_2$SO$_4$ are neater to apply than sodium silicate. The resulting residues from NaCl and Na$_2$SO$_4$ aqueous compositions are thin white deposits. The remains from a sodium silicate application is slightly messier, but also results in a white solidified film on the circumferential wall of the hole to which it is applied.

From the results of the experiments, it was concluded that vents can be inhibited from developing into glass breakage during a thermal treatment characteristic of glass sheet tempering by applying a composition that flows more readily than the glass sheet in the temperature range of the thermal treatment so that it flows into the vents during said thermal treatment. Preferably, the composition does not decompose into a composition that lacks utility for this intended purpose (such as sodium nitrite). It is believed that the composition contains a metal, probably in ionic form, that forms a glassy composition on the scored glass surface to which it is applied when subjected to the same thermal treatment cycle as the treated apertured glass sheet. The glassy composition of the thin coating thus formed has a higher concentration of a metal that tends to reduce the viscosity of the resulting glass composition to one that is less than that of the composition of the glass sheet. These metals include the sodium and lead.

The composition applied to the perimeter of the hole must adhere to the hole sufficiently at room temperature and be sufficiently viscous to avoid flowing over a major glass sheet surface. Such flowing may introduce surface area defects of an optical nature that would impair the desired uniform optical properties of the tempered glass article that results.

The article that results from the performance of the improved method based on the present invention comprises a glass sheet having a hole extending entirely through its thickness, the composition of the glass sheet having a given viscosity range in the temperature range of thermal treatment required for tempering. The resulting article is characterized by a coating consisting essentially of a glassy composition having a lower viscosity than that of the glass sheet throughout the temperature range required for tempering bonded to the wall of said hole. When the glass sheet is composed of a soda-lime-silica glass composition, the coating that forms on the interior wall of the hole during the thermal treatment incidental to tempering is composed of a glassy composition having a higher concentration ratio of soda or lead to lime than the glass sheet. The coating on the periphery of the hole has a maximum thickness of approximately 1 mil (0.0254 mm).

The treated glass sheet may also be shaped and/or exposed to a film forming composition between the heating step and the rapid cooling step of the tempering operation. Also, if desired, a glass sheet (having a scored region) that is to be annealed rather than tempered, with or without the other processing steps such as shaping and/or coating, may have its scored region treated prior to the thermal treatment of heating followed by more gradual, controlled cooling characteristic of annealing. However, in annealing, the temporary stresses induced in the glass are not as large as those induced during the rapid cooling step of tempering. Therefore, it is less likely that such treatment of the scored region prior to thermal treatment will be needed if the glass sheet is to be annealed rather than tempered.

The form of the invention shown and described in this disclosure represents an illustrative preferred embodiment and certain modifications thereof. It is understood that various changes, such as applying alternative viscosity reducing compositions to a scored region, may be made without departing from the gist of the invention as defined in the claimed subject matter which follows.

I claim:

1. In the art of heat treating a series of float glass sheets of soda-lime-silica composition having a scored region susceptible to breakage during thermal treatment during which said glass sheets differing in thickness and in stress around the scored region are heated to elevated temperatures differing according to glass sheet thickness within a temperature range above the strain point of float glass and rapidly cooled below said strain point, which thermal treatment is more likely to develop said scored region into a break in those sheets of said series heated to a maximum temperature at the lower end of said temperature range and to cause some sheets in said series that are heated to a higher maximum temperature within said temperature range to tend to lose their shape before said rapid cooling, the improvement consisting of the one step of applying exclusively to the vicinity of said scored region, prior to said thermal treatment, a liquid composition adherent to said scored region, and containing as an essential ingredient sodium silicate, which composition is capable of flowing and healing said scored region and does not decompose into a composition that fails to protect said scored region during said thermal treatment, and subjecting said glass sheet with said composition applied to protect said scored region to said thermal treatment, whereby the frequency of breakage in said scored region is less than that experienced in the absence of said one step of applying said liquid composition and is less than the frequency of breakage experienced by glass sheets attaining equal maximum temperatures at the lower end of said temperature range after either no pretreatment with any composition or after pretreatment with a composition essentially free of sodium silicate.

2. The improvement as in claim 1, wherein said sodium silicate composition is applied in the form of a dispersion within an aqueous carrier.

3. The improvement as in claim 1, wherein said scored region is in the vicinity of a hole extending through the thickness of said glass sheet and said composition is applied to the circumferential wall of said hole.

4. The improvement as in claim 3, wherein said composition is applied as a coating having a maximum thickness approximating 1 mil (0.0254 mm).

5. The improvement as in claim 3 wherein said composition is applied by a felt-tipped pencil-like member whose felt tip is impregnated with said composition.

6. The improvement as in claim 3, for use in making a temperature vehicle window, wherein said one step of applying to the wall of said hole a liquid composition containing sodium silicate as an essential ingredient is followed by heating said sheet with said sodium silicate containing composition applied to said hole to an elevated temperature sufficient for thermal tempering and cooling said sheet while so heated at a rate sufficient to impart at least a partial temper in the sheet.

7. A method as in claim 6, further including shaping said glass sheet to a desired shape between said heating and cooling steps.

8. A tempered glass article comprising a sheet of float glass of soda-lime-silica composition having a hole extending entirely through its thickness, said glass sheet having a given viscosity range in the temperature range of thermal treatment required for tempering said glass sheet and a coating bonded to the wall of said hole, said coating consisting essentially of a glassy sodium silicate composition adherent to the wall of said hole and having a lower viscosity than that of said glass sheet throughout said temperature range.

9. An article as in claim 8, wherein said coating has a maximum thickness of approximately one mil (0.0254 mm).

10. A tempered glass article as in claim 8 in the form of a covered vehicle window.

* * * * *